(12) United States Patent
Russell et al.

(10) Patent No.: US 10,524,113 B2
(45) Date of Patent: Dec. 31, 2019

(54) SENDING MESSAGES INCLUDING ACCESS POINT NAMES

(71) Applicant: BLACKBERRY LIMITED, Waterloo (CA)

(72) Inventors: Nicholas James Russell, Newbury (GB); Richard Charles Burbridge, Swindon (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/943,084

(22) Filed: Apr. 2, 2018

(65) Prior Publication Data

US 2018/0227745 A1    Aug. 9, 2018

Related U.S. Application Data

(63) Continuation of application No. 14/166,128, filed on Jan. 28, 2014, now Pat. No. 9,942,746.

(51) Int. Cl.
*H04W 4/00* (2018.01)
*H04W 8/18* (2009.01)
*H04W 8/12* (2009.01)

(52) U.S. Cl.
CPC ............... *H04W 8/18* (2013.01); *H04W 8/12* (2013.01)

(58) Field of Classification Search
CPC ............................... H04W 8/06; H04W 48/18
See application file for complete search history.

(56) References Cited

U.S. PATENT DOCUMENTS

| 8,467,782 | B1 | 6/2013 | Faccin |
| 9,924,434 | B1* | 3/2018 | Ramamurthy ........ H04W 36/24 |
| 2003/0036392 | A1* | 2/2003 | Yukie ....................... H04W 8/00 |
| | | | 455/461 |

(Continued)

FOREIGN PATENT DOCUMENTS

| CN | 1939001 | 3/2007 |
| CN | 101374336 | 2/2009 |

(Continued)

OTHER PUBLICATIONS

BEREC, BoR (13) 82, International Roaming Regulation, BEREC Guidelines on Roaming Regulation (EC) No. 531/2012 (Third Roaming Regulation) (Articles 4 and 5 on Separate Sale of Roaming Services), Jul. 5, 2013 (19 pages).

(Continued)

*Primary Examiner* — Shantell L Heiber
(74) *Attorney, Agent, or Firm* — Trop, Pruner & Hu, P.C.

(57) ABSTRACT

In some examples, a user equipment (UE) stores a first network configuration that maps to a first set of corresponding packet-switched settings comprising a first access point name (APN), stores a second network configuration that maps to a second set of corresponding packet-switched settings comprising a second APN, and determines whether the UE is in a first network or a second network. In response to the UE being in the first network, the UE sends a first message to the first network to activate a data connection in which a message includes the first APN. In response to the UE being in the second network, the UE sends a second message to the second network to activate a data connection in which a message includes the second APN.

18 Claims, 9 Drawing Sheets

(56) References Cited

U.S. PATENT DOCUMENTS

| | | | | |
|---|---|---|---|---|
| 2007/0066304 | A1* | 3/2007 | Lee | H04W 48/20 455/436 |
| 2008/0285492 | A1 | 11/2008 | Vesterinen | |
| 2009/0196265 | A1 | 8/2009 | Mariblanca | |
| 2012/0002608 | A1* | 1/2012 | Vesterinen | H04W 8/082 370/328 |
| 2012/0003973 | A1 | 1/2012 | Tseng | |
| 2012/0023189 | A1* | 1/2012 | Giaretta | H04W 48/18 709/217 |
| 2012/0077496 | A1* | 3/2012 | Mathias | G06Q 30/06 455/435.1 |
| 2012/0079084 | A1 | 3/2012 | Forssell et al. | |
| 2012/0204243 | A1* | 8/2012 | Wynn | H04L 63/0428 726/5 |
| 2013/0003697 | A1 | 1/2013 | Adjakple | |
| 2013/0102356 | A1* | 4/2013 | Shaw | H04W 48/17 455/525 |
| 2013/0337808 | A1 | 12/2013 | Zhao et al. | |
| 2014/0105199 | A1* | 4/2014 | Tian | H04W 48/20 370/338 |
| 2015/0358806 | A1 | 12/2015 | Gorey | |

FOREIGN PATENT DOCUMENTS

| | | |
|---|---|---|
| CN | 101467476 | 6/2009 |
| CN | 103379463 A | 10/2013 |

OTHER PUBLICATIONS

3GPP TS 22.011 V12.0.0, Technical Specification, 3rd Generation Partnership Project, Technical Specification Group Services and System Aspects, Service accessibility (Release 12) Mar. 2013 (26 pages).
3GPP TS 22.042 V11.0.0, Technical Specification, 3rd Generation Partnership Project, Technical Specification Group Services and System Aspects, Network Identity and TimeZone (NITZ); Service description, Stage 1 (Release 11) Sep. 2012 (8 pages).
3GPP TS 22.060 V11.0.0, Technical Specification 3rd Generation Partnership Project, Technical Specification Group Services and System Aspects, General Packet Radio Service (GPRS), Service description, Stage 1 (Release 11) Sep. 2012 (26 pages).
3GPP TS 22.278 V12.4.0, Technical Specification 3rd Generation Partnership Project, Technical Specification Group Services and System Aspects, Service requirements for the Evolved Packet System (EPS) (Release 12) Sep. 2013 (45 pages).
3GPP TS 23.003 V12.1.0, Technical Specification 3rd Generation Partnership Project, Technical Specification Group Core Network and Terminals, Numbering, addressing and identification (Release 12) Dec. 2013 (86 pages).
3GPP TS 23.060 V12.3.0, Technical Specification 3rd Generation Partnership Project, Technical Specification Group Services and System Aspects, General Packet Radio Service (GPRS), Service description, Stage 2 (Release 12) Dec. 2013 (344 pages).
3GPP TS 23.122 V12.3.0, Technical Specification 3rd Generation Partnership Project, Technical Specification Group Core Network and Terminals, Non-Access-Stratum (NAS) functions related to Mobile Station (MS) in idle mode (Release 12) Dec. 2013 (45 pages).
3GPP TS 23.401 V12.3.0, Technical Specification 3rd Generation Partnership Project, Technical Specification Group Services and System Aspects, General Packet Radio Service (GPRS) enhancements for Evolved Universal Terrestrial Radio Access Network (E-UTRAN) access (Release 12) Dec. 2013 (98 pages).
3GPP TS 23.402 V12.3.0, Technical Specification 3rd Generation Partnership Project, Technical Specification Group Services and System Aspects, Architecture enhancements for non-3GPP accesses (Release 12) Dec. 2013 (288 pages).
3GPP TS 24.008 V12.4.0 Technical Specification 3rd Generation Partnership Project, Technical Specification Group Core Network and Terminals, Mobile radio interface Layer 3 specification, Core network protocols, Stage 3 (Release 12) Dec. 2013 (325 pages).
3GPP TS 24.301 V12.3.0,Technical Specification 3rd Generation Partnership Project, Technical Specification Group Core Network and Terminals, Non-Access-Stratum (NAS) protocol for Evolved Packet System (EPS), Stage 3 (Release 12) Dec. 2013 (353 pages).
3GPP TS 24.302 V12.3.0, Technical Specification 3rd Generation Partnership Project, Technical Specification Group Core Network and Terminals, Access to the 3GPP Evolved Packet Core (EPC) via non-3GPP access networks, Stage 3 (Release 12) Dec. 2013 (82 pages).
3GPP TS 29.060 V12.3.0,Technical Specification 3rd Generation Partnership Project, Technical Specification Group Core Network and Terminals, General Packet Radio Service (GPRS), GPRS Tunnelling Protocol (GTP) across the Gn and Gp interface (Release 12) Dec. 2013 (179 pages).
EU Roaming regulation III, Structural Solutions, High Level Technical specifications, Draft Version 1.0, Oct. 7, 2013 (67 pages).
Barnes et al., Internet Engineering Task Force (IETF) Request for Comments: 6280, BCP: 160, Updates: 3693, 3694, Category: Best Current Practice, ISSN: 2070-1721, An Architecture for Location and Locatin Privacy in Internet Applications, Jul. 2011 (41 pages).
European Patent Office, Communication pursuant to Article 94(3) EPC for EP Appl. No. 15152941.9 dated Mar. 6, 2017 (5 pages).
Thompson et al., Open Mobile Alliance (OMA) Device Management Overview, Jun. 2010 (23 pages).
European Patent Office, Communication pursuant to Article 94(3) EPC for EP Appl. No. 15152941.9 dated Jul. 1, 2016 (12 pages).
3GPP TSG-SA WG1 Meeting #63, S1-134014, Zagreb, Croatia, Title: Discussion paper on APN storage in UICC, Source: Gemalto N.V., G&D, Aug. 19-23, 2013 (3 pages).
European Patent Office, Extended European Search Report for EP Appl. No. 15152941.9 dated Jun. 12, 2015 (12 pages).
European Patent Office, Summons to attend oral proceedings pursuant to Rule 115(1) EPC for Appl. No. 15152941.9 dated Apr. 30, 2018 (18 pages).

\* cited by examiner

SENDING MESSAGES INCLUDING ACCESS POINT NAMES

CROSS REFERENCE TO RELATED APPLICATION

This is a continuation of U.S. application Ser. No. 14/166,128, filed Jan. 28, 2014, which is hereby incorporated by reference.

BACKGROUND

A user equipment (UE) is able to wirelessly connect to a mobile communications network to perform communications. A mobile communications network includes cells that correspond to respective regions in which UEs are able to establish wireless connections with the mobile communications network.

Different mobile communications networks can be maintained and managed by different network providers. UEs associated with subscribers of a given network operator are able to access the mobile communications network of the given network operator.

Network operators can also enter into agreements that allow UEs of subscribers of a first network operator to access the mobile communications network of a second network operator. When a UE is in the coverage area of a mobile communications network ("home network") to which the UE is subscribed, the UE can access its home network. When the UE travels to a location that is outside the coverage area of the UE's home network, the UE can access a visited (or foreign) mobile communications network. A UE accessing a visited network is considered a roaming UE.

BRIEF DESCRIPTION OF THE DRAWINGS

Some embodiments are described with respect to the following figures.

DETAILED DESCRIPTION

Figure 1:
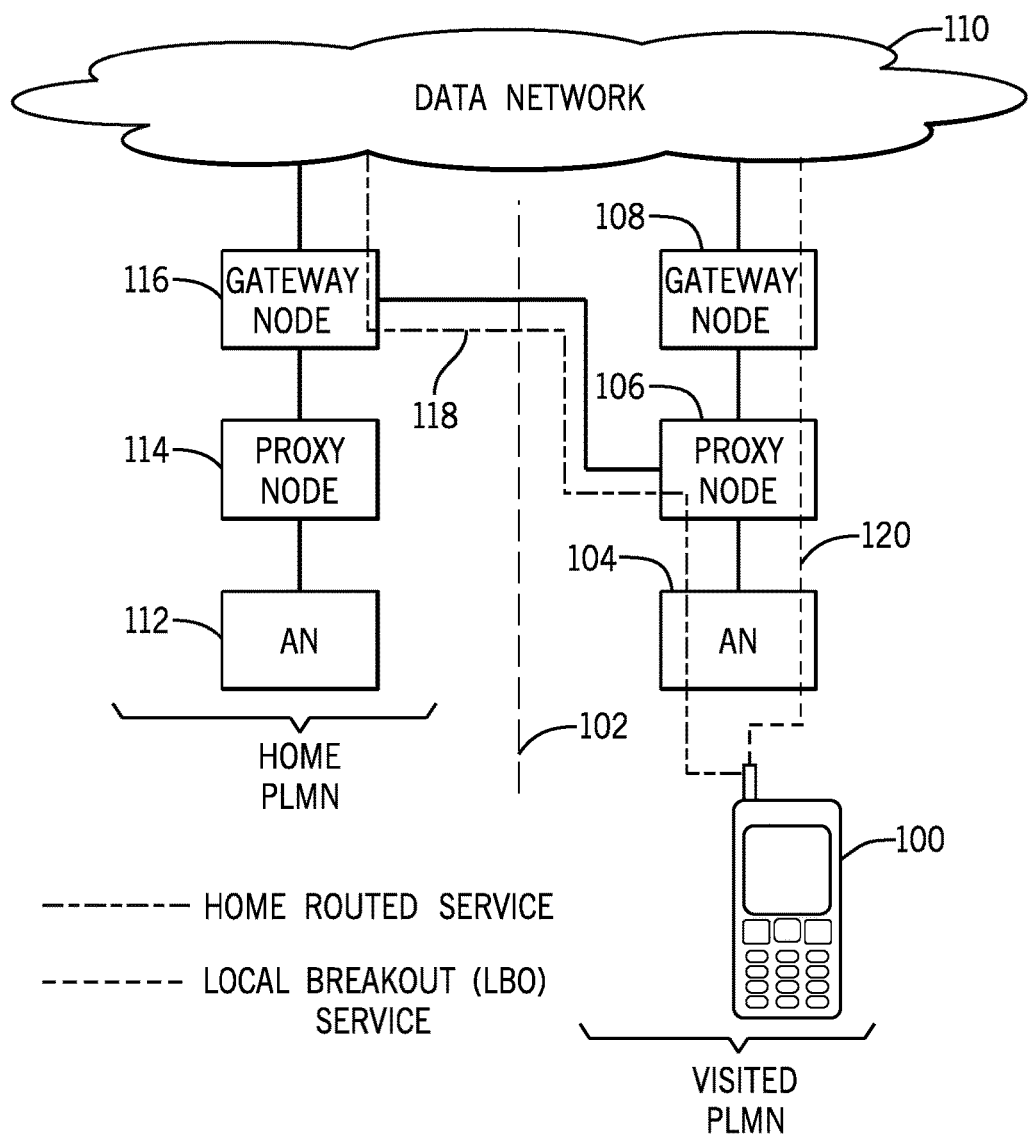
FIG. 1 is a block diagram of an example network arrangement according to some implementations.

A user equipment (UE), such as a smartphone, tablet computer, notebook computer, desktop computer, game appliance, and so forth, can perform packet-switched data communications in a mobile communications network. A packet-switched data communication can refer to communication in which data is carried in packets that are routed using address information contained in each packet.

Packet-switched data communications can be performed in various different types of mobile communications networks, which can operate according to various different standards. Examples of such standards include standards provided by the Third Generation Partnership Project (3GPP), or other standards bodies. Examples of mobile communications networks that operate according to 3GPP standards include General Packet Radio Service (GPRS) networks, Long-Term Evolution (LTE) networks (also referred to as Evolved Universal Terrestrial Radio Access (E-UTRA) networks), and others. Examples of non-3GPP mobile communications networks include wireless local area networks (WLANs), Wi-Fi networks, Worldwide Interoperability for Microwave Access (WiMax) networks, and others.

To perform packet-switched communications, a data connection can be activated in a mobile communications network to carry data packets of the packet-switched communications. According to GPRS, a data connection can be referred to as a Packet Data Protocol (PDP) context. A PDP context can be associated with various parameters that are used for performing packet-switched communications.

According to LTE, a data connection can be referred to as a packet data network (PDN) connection. A PDN connection can include one or more bearers (also referred to as an Evolved Packet System or EPS bearer) that is used for carrying data packets. Procedures for activating a PDP context are described in 3GPP TS 23.060. Procedures for activating a new PDN connection are described in 3GPP TS 23.401. Data connections can also be activated in other types of mobile communications networks. Activating a data connection can refer to setting up or establishing the data connection such that resources are available or can be obtained for carrying data packets of the data connection.

More generally, the term "data connection" can refer to any one or more of the following: a PDP context, a PDN connection, or any other connection between a UE and a network that allows packet-switched communications.

When a UE enters a coverage area of a mobile communications network, the UE can perform a registration process to register with the mobile communications network. Registering the UE in a mobile communications network makes the presence of the UE known to the mobile communications network.

A mobile communications network can be provided by a network operator. The mobile communications network can also be referred to as a public land mobile network (PLMN). A PLMN can be identified by a mobile country code (MCC) and a mobile network code (MNC).

In the ensuing discussion, reference is made to PLMNs. However, it is noted that techniques or mechanisms according to some implementations can be applied to other types of networks that are provided by network operators. More generally, a network or mobile communication network can refer to any defined arrangement of network nodes that UEs can wirelessly access for the purpose of performing communications with other endpoints, which can include wireless endpoints or wired endpoints. Different networks can be provided by respective different network operators. Note also that in some examples, different networks can be provided by the same network operator, such as a network operator that provides both a cellular network and a Wi-Fi network.

The user of a UE can be a subscriber of a network operator that provides a first PLMN. This first PLMN can be referred to as the home PLMN of the UE, and the network provider of the home PLMN can be referred to as a home network provider. On the other hand, when the UE enters a coverage area of a PLMN operated by a network operator different from the home network operator, then the UE has entered into a visited PLMN (or foreign PLMN).

In some examples, another PLMN can be configured by the home network provider as an equivalent home PLMN. The UE being in the coverage area of the equivalent home PLMN is considered to be in its home PLMN. The term home PLMN used in this disclosure can refer to either the actual home PLMN of the UE or the equivalent home PLMN of the UE.

Traditionally, when a UE is roaming in a visited PLMN, the UE continues to obtain data services from the UE's home PLMN. FIG. 1 shows an example of a UE 100 in a visited PLMN (which is the PLMN that is not the home PLMN of the UE 100). A vertical dashed line 102 represents a boundary between the home PLMN and visited PLMN in FIG. 1.

The visited PLMN includes an access network 104 that allows the UE 100 to wirelessly connect to the visited PLMN. In some other examples, the access network 104 can be a wired access network that the UE 100 connects to in a wired manner. The visited PLMN also includes a proxy node 106 and a gateway node 108. In a GPRS mobile communications network, the proxy node 106 can be a serving GPRS support node (SGSN), which is responsible for the delivery of data packets from and to the UEs within the service area of the SGSN. Examples of tasks of the SGSN include packet routing and transfer, mobility management, logical link management, authentication and charging functions, and so forth.

In an LTE mobile communications network, the proxy node 106 can include a serving gateway (S-GW), which routes and forwards data packets of UEs served by the S-GW. The S-GW can also act as a mobility anchor for the user plane during handover procedures.

Other types of mobile communications networks can similarly include proxy nodes.

The proxy node 106 is provided between the access network 104 and the gateway node 108. In a GPRS mobile communications network, the gateway node 108 can be a gateway GPRS support node (GGSN), which is responsible for internetworking between the GPRS mobile communications network and a data network (e.g. Internet, a private network, etc.) 110. In an LTE mobile communications network, the gateway node 108 can be a packet data network gateway (PDN-GW or P-GW), which is the entry and egress point for data communicated between UEs in the LTE mobile communications network and the data network 110.

Other types of mobile communications networks can similarly include gateway nodes.

The home PLMN similarly includes an access network 112, a proxy node 114, and a gateway node 116. In other examples, the proxy node 114 in the home PLMN can be omitted.

A path 118 depicts the path of data packets for a data connection when data services for the UE 100 which is attached to the visited PLMN is provided by the home PLMN. The path 118 between the UE 100 and the data network 110 traverses through the access network 104 in the visited PLMN, the proxy node 106 in the visited PLMN, and the gateway node 116 in the home PLMN. Thus, when data services are provided by the home PLMN while the UE is attached to the visited PLMN, the data connection for the UE passes through the gateway node 116 of the home PLMN.

Regulations or laws may be promulgated by government bodies that may specify that a roaming UE (which is attached to a visited PLMN) can selectively use data services (e.g. Internet access or other data services) directly from the visited PLMN to which the UE 100 is attached. This is referred to as a Local Break-Out (LBO) provider solution. The LBO provider solution allows the user of a UE that is roaming in a visited PLMN to select an LBO provider for the data connection, such that data services would not be provided by the home PLMN. In other examples, use of the LBO provider solution may not be governed by a regulation or law of a government body. Rather, a visited network can offer the LBO provider solution to roaming UEs.

In the example of FIG. 1, assuming that the user has selected the network provider of the visited PLMN as the LBO provider, a path 120 for a data connection between the UE 100 and the data network 110 traverses through just nodes in the visited PLMN, including the access network 104, the proxy node 106, and the gateway node 108.

A user can establish an agreement with an LBO provider, which may be a visited PLMN network operator or a mobile virtual network operator (MVNO), for that LBO provider to provide certain data connectivity (e.g. Internet access) in one or more visited networks. An MVNO is a service provider that uses a third party's (or another operator's) mobile communications network to offer mobile subscriptions to users.

The agreement between the user and the LBO provider can be established ahead of time (prior to the UE requesting data services in the visited PLMN), such as through a website of the LBO provider. Alternatively, the agreement between the UE and the LBO provider can be established at the time of the UE requesting data services in the visited PLMN.

The agreement can be time constrained (e.g. the user may sign up and/or make payment for data services of a specified duration, e.g. an hour, a day, a week, and so forth). Traditionally, the user can set the UE to manual network selection mode so that the user can manually select the correct visited network for the LBO provider (the manual network selection mode can ensure that the UE does not automatically change to a different visited network without intervention from the user).

Different network operators can use different packet-switched (PS) settings (also referred to as PS configurations) for activating data connections. A PS setting can include various PS parameters (also referred to as "PS information elements") that are associated with activation of a data connection. In the ensuing discussion, reference to a "PS parameter" is equivalently a reference to a "PS information element." One example PS parameter is an access point name (APN), which identifies a packet data network (PDN) that the UE is to communicate with. The APN can also define the type of data service that is to be provided. For example, a first network operator may use APN="operatorX.co.uk" to provide Internet access to the UE, while a second network operator may use APN="operatorY.de" to provide Internet access to the UE.

Examples of other PS parameters that configure packet-switched communications of a UE can include one or more of the following, as examples: PDP Type or PDN Type (e.g. Internet Protocol version 4 (IPv4), IPv6, IPv4v6, etc.), IP address(es) or PDP address(es) (e.g. an IPv4 address, IPv6 address, etc.), Dynamic Address Allowed indicator (for indicating whether use of dynamic addressing is allowed), authentication credentials (e.g. username, password, certificate, shared secret, key(s), etc.), quality-of-service (QoS) Profile Requested (for specifying a QoS profile which includes QoS settings), Traffic Flow Template (TFT) (which includes a set of information for filtering different data packet flows), Allowed Closed Subscriber Group (CSG) List (which is a list of CSGs, where a CSG is a set of users that has connectivity access to a specific cell, such as a femto-cell), an Operator CSG List, and so forth.

To avoid the user having to configure a PS setting (that includes a set of PS parameters) manually after inserting a subscriber identity module (SIM) card or universal integrated circuit card (UICC) of a network operator, UEs often have a preconfigured list or table of PS settings for different network operators. When the SIM or UICC card of a given network operator is inserted into the UE, then the PS parameters of the UE is set according to the respective PS setting for the given network operator contained in the preconfigured list or table of PS settings. The UE can make further changes to the PS parameters if desired.

The PS setting selected from the preconfigured list or table can be based on analysis of the MCC and MNC of the International Mobile Subscriber Identity (IMSI) stored on the SIM card or UICC. Traditionally (assuming that the LBO provider solution is not used), once a PS setting is selected based on the information of the SIM card or UICC for the given network operator, the same PS setting is used irrespective of whether the UE is in the home PLMN or roaming in a visited PLMN. That is, the UE would generally use the same PS setting in the visited PLMN as the UE would in its home PLMN. Using the same PS setting regardless of which PLMN (home or visited) the UE is in can be referred to as a home provider solution, and the PS setting that the UE uses for the home provider solution is referred to as a "home PS setting."

In contrast, the PS setting that a UE uses to connect to an LBO provider (as part of an LBO provider solution if used) is referred to as an "LBO PS setting."

For a user to be able to select the LBO provider solution (and thus select an LBO provider) for a data connection as opposed to the home provider solution, a specific PS setting (including the APN parameter and/or other parameters) for the LBO provider solution may have to be configured at the UE so that the UE can use the LBO provider solution. The PS setting of the LBO provider solution may apply only when the UE is roaming; in other words, such PS setting is not used when the UE is attached to its home PLMN. Moreover, the specific PS setting of the LBO provider solution may apply to just a subset of visited PLMNs to which the UE may attach; the specific PS setting may not apply to other visited PLMNs to which the UE may attach. Finally, the specific PS setting of the LBO provider solution would not be used if the user has opted to not use the LBO provider solution.

Traditionally, there is no automatic way for a UE to change PS settings depending on the PLMN to which the UE is attached. This may lead to a sub-optimal user experience if the user of the UE (that has roamed to a visited PLMN) has to manually reconfigure the PS setting to the LBO PS setting. Also, once the UE moves back to its home PLMN, then the user may have to manually reconfigure the UE to the home PS setting.

Figure 2:
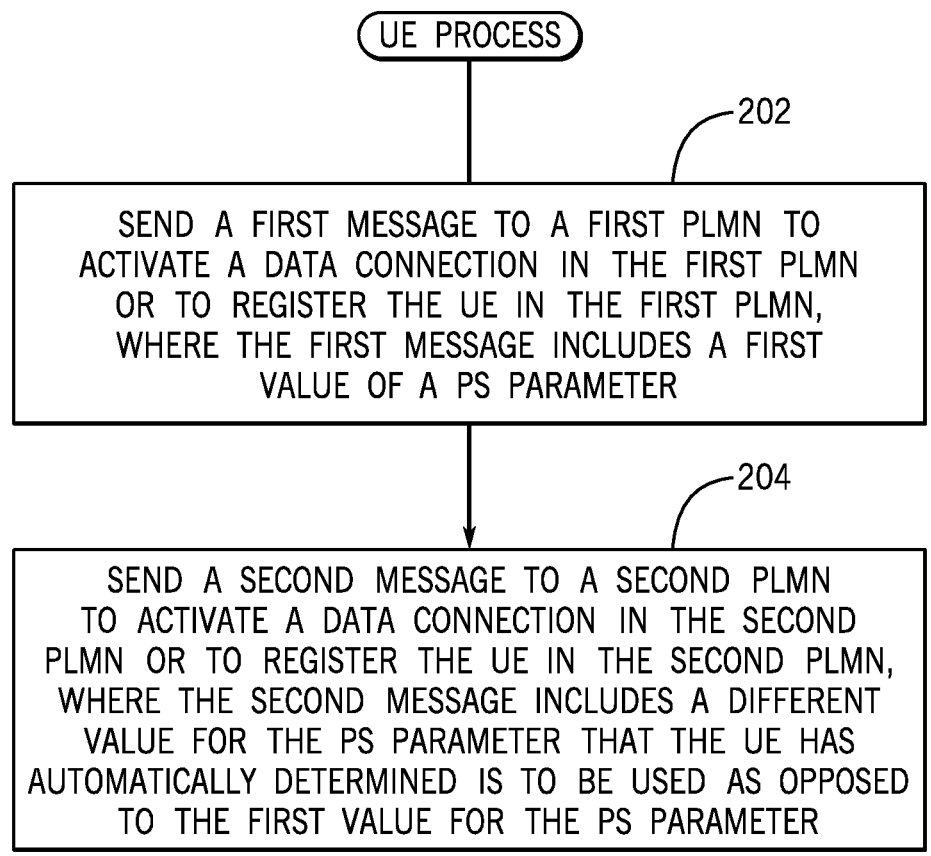
FIGS. 2-4 and 6 are flow diagrams of user equipment (UE) processes according to various implementations.

FIG. 2 is a flow diagram of a process according to some implementations to address the foregoing issues. The process of FIG. 2 may be performed by a UE, such as UE 100 in FIG. 1. The UE is capable of communicating in multiple PLMNs.

At a first time, the UE sends (at 202) a first message to a first PLMN to activate a data connection in the first PLMN or to register the UE in the first PLMN. The first message can include a first value for a PS parameter (e.g. an APN parameter and/or another PS parameter). The PS parameter included in the first message is used for activating the data connection in the first PLMN, or to register the UE in the first PLMN.

At a later time, the UE sends (at 204) a second message to a second PLMN to activate a data connection in the second PLMN or to register the UE in the second PLMN, where the second message includes a different value for the PS parameter that the UE has automatically determined is to be used as opposed to the first value for the PS parameter included in the first message sent by the UE to the first PLMN. The PS parameter included in the second message is used for activating the data connection in the second PLMN, or to register the UE in the second PLMN.

The sending of the second message (at 204) may be triggered by detecting that the UE has transitioned from the coverage area of the first PLMN to the coverage area of the second PLMN. The second PLMN can be the home PLMN (such as when the UE has returned to the coverage area of the home PLMN from a visited PLMN). Alternatively, the second PLMN can be a visited PLMN (such as when the UE has moved to the coverage area of the visited PLMN from the home PLMN or such as when the UE has moved to the coverage area of a different visited PLMN from a previous visited PLMN).

Solution 1

Figure 3:
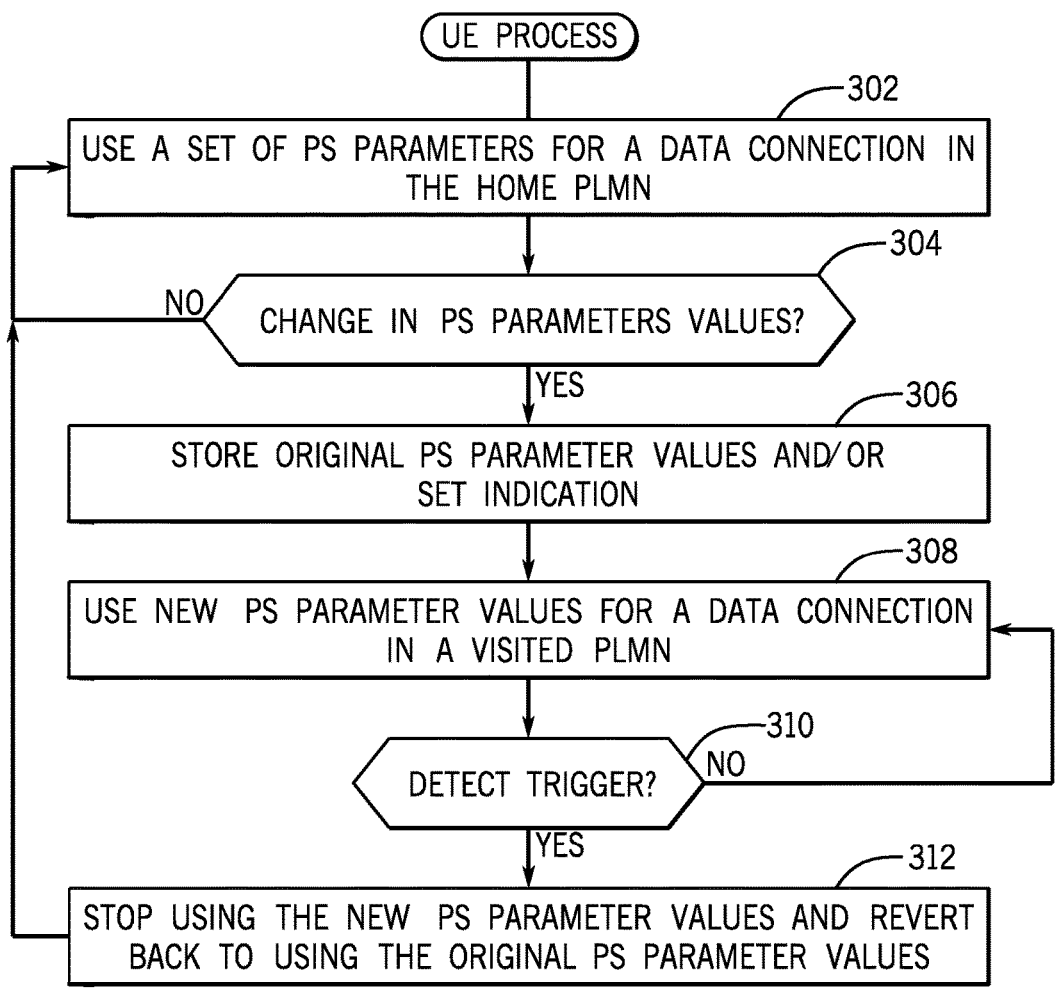

In accordance with some implementations, it is assumed that the UE initially has just a single set of PS parameters, which may be stored by the UE or may be sent to the UE by the network. As shown in FIG. 3, the UE uses (at 302) this single set of PS parameters (which can collectively be referred to as a PS setting) for a data connection in the home PLMN. In response to detecting (at 304) a change in the values of the PS parameters (such as due to the user or process in the UE changing the PS parameters after the UE has roamed to a visited PLMN), the UE may store (at 306), into a storage medium, the initial values of the PS parameters before the change was applied. Such initial values of the PS parameters are referred to as the original PS parameter values, and the changed values of the PS parameters are referred to as the new PS parameter values. Alternatively, if the original PS parameter values are already stored, then the UE may set an indication (e.g. a flag or any other indicator) to indicate that the UE has changed from using the original PS parameter values to using new PS parameter values. As yet another alternative, in response to detecting the change in PS parameters, the UE can store the original PS parameter values into the storage medium, and set the indication.

The UE then uses (at 308) the new PS parameter values for a data connection in the visited PLMN. Upon detecting (at 310) a specified trigger, the UE may stop (at 312) using the new PS parameter values, and can revert back to using the original PS parameter values, which are stored in the UE or the storage medium accessible by the UE.

Examples of triggers that can cause the UE to stop using the new PS parameter values and revert back to the original PS parameter values include any one or more of the following:

1. The UE registers (or attempts to register) with the home PLMN (an actual home PLMN or an equivalent home PLMN).
2. The UE registers (or attempts to register) with a given PLMN from the same country as the home PLMN (for example, the MCC of the given PLMN is equal to the MCC of the home PLMN, or the MCC of the given PLMN is associated to a same country or state as the MCC of the home PLMN). The UE roaming into a visited PLMN of the same country as the home PLMN is often referred to as national roaming and may be used when there is a specific commercial arrangement between the home PLMN and the visited PLMN of the same country (e.g., the home PLMN has a commercial arrangement with the visited PLMN of the same country to provide service in areas not covered by the home PLMN's radio network). With national roaming in the visited PLMN, the user may not be subject to additional roaming charges, and hence the user is less likely to benefit from using the LBO provider solution when roaming in such visited PLMN in the same country as the home PLMN. Consequently, it may be appropriate for the UE to switch back to using the original PS parameter values upon the UE's return to a PLMN of the same country as the home PLMN.
3. The UE registers (or attempts to register) with a PLMN that is different from the visited PLMN where the user has chosen to have data services provided by an LBO provider.
4. The user switched the PLMN selection mode from the manual network selection mode to the automatic network selection mode, or vice versa.
5. A request to establish a data connection is rejected by the current PLMN. For example, the request may be rejected with one or more specific cause codes e.g. reject cause #27 (missing or unknown APN) or #33 (requested service option not subscribed) or another cause code that may be specified for the specific LBO provider scenario (e.g. the current PLMN detected a value in a data connection establishment attempt message (e.g. Activate PDP Context Request, PDN Connectivity Request, etc.) that the current PLMN recognizes as being used for an LBO provider e.g. APN set to "EUInternet".
6. The UE detects that it is no longer in a coverage area of a PLMN to which it is or was registered.

Although some example triggers are listed above, it is noted that in other examples, other triggers can be used for causing the UE to stop using the new PS parameter values and revert back to the original PS parameter values.

In some examples, before the UE stops using the new PS parameter values and reverts back to the original PS parameter values, the UE may request user confirmation of the reversion back to the original PS parameter values from the new PS parameter values.

When the UE stops using the new PS parameter values and starts using the original PS parameter values, the UE may update the PS parameter values that are presented to one or some combination of the following: the user, an application, or some other entity in the UE.

Assuming that the original PS parameter values are contained in ORIGINAL_PS_SETTING and the new PS parameter values are contained in NEW_PS_SETTING, if the UE detects a further change in the PS parameter values (referred to as "subsequent PS parameter values"), where the further change occurs after the previous change from the original PS parameter values to the new PS parameter values, then the following may occur. The UE may perform one of the following actions if the UE has not yet stopped using the new PS parameter values and reverted back to using the original PS parameter values:

update ORIGINAL_PS_SETTING to contain the new PS parameter values, and update NEW_PS_SETTING to contain the subsequent PS parameter values, or update NEW_PS_SETTING to contain the subsequent PS parameter values, which will leave the stored original PS parameter values (in ORIGINAL_PS_SETTING) unchanged.

Following either of the foregoing actions, the UE can delete or forget or discard the subsequent PS parameter values.

Figure 4:
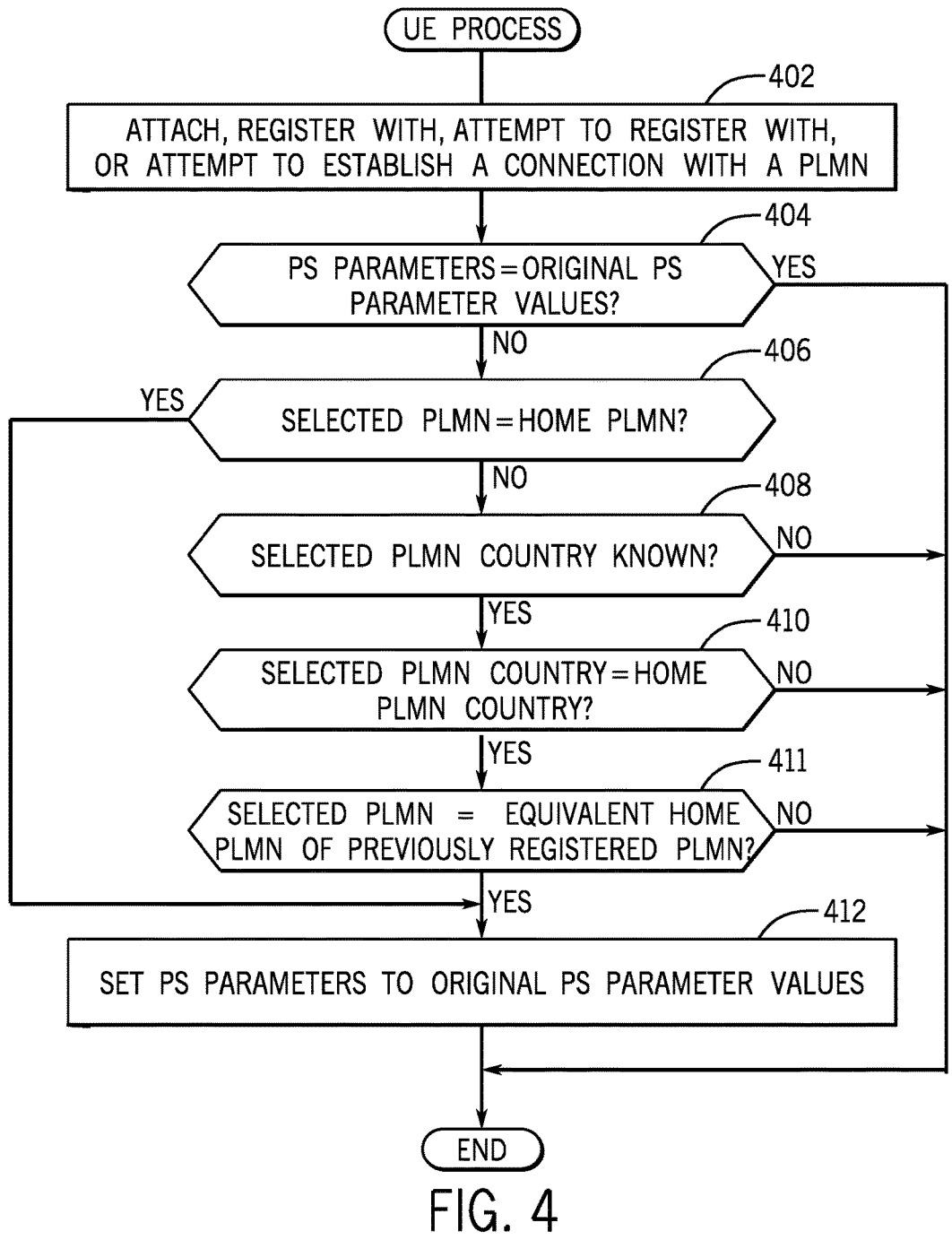

FIG. 4 is a further flow diagram of a process that can be performed by the UE, according to some implementations.

According to FIG. 4, the UE attaches to or registers with or attempts to register with or attempts to establish a connection with (at 402) a PLMN. In the ensuing discussion, this PLMN is the "selected PLMN." The UE next determines (at 404) whether the PS parameters are equal to the original PS parameter values. If so, then the process of FIG. 4 ends. The PS parameters being equal to the original PS parameter values indicates that the PS parameters have not been changed, such as to use an LBO provider solution in a visited PLMN.

If the PS parameters are not equal to the original PS parameter values, as determined at 404, then the UE determines (at 406) whether the selected PLMN is the home PLMN or an equivalent home PLMN. If so, then the PS parameters can be set (at 412) to the original PS parameter values. This allows the UE to revert back to the original PS parameter values.

If the determination at 406 indicates that the selected PLMN is not the home PLMN or an equivalent home PLMN, then the UE determines (at 408) whether the country of the selected PLMN is known. If not, then the process ends. However, if the country of the selected PLMN is known, then the UE determines (at 410) whether the country of the selected PLMN is the country of the home PLMN. If so, then the UE determines (at 411) whether the selected PLMN is an equivalent home PLMN of a previously registered PLMN. If so, then the PS parameters can be set to the original PS parameter values (at 412). If the country of the selected PLMN is not the country of the home PLMN, or if the selected PLMN is not an equivalent home PLMN, then the process ends.

Figure 5:
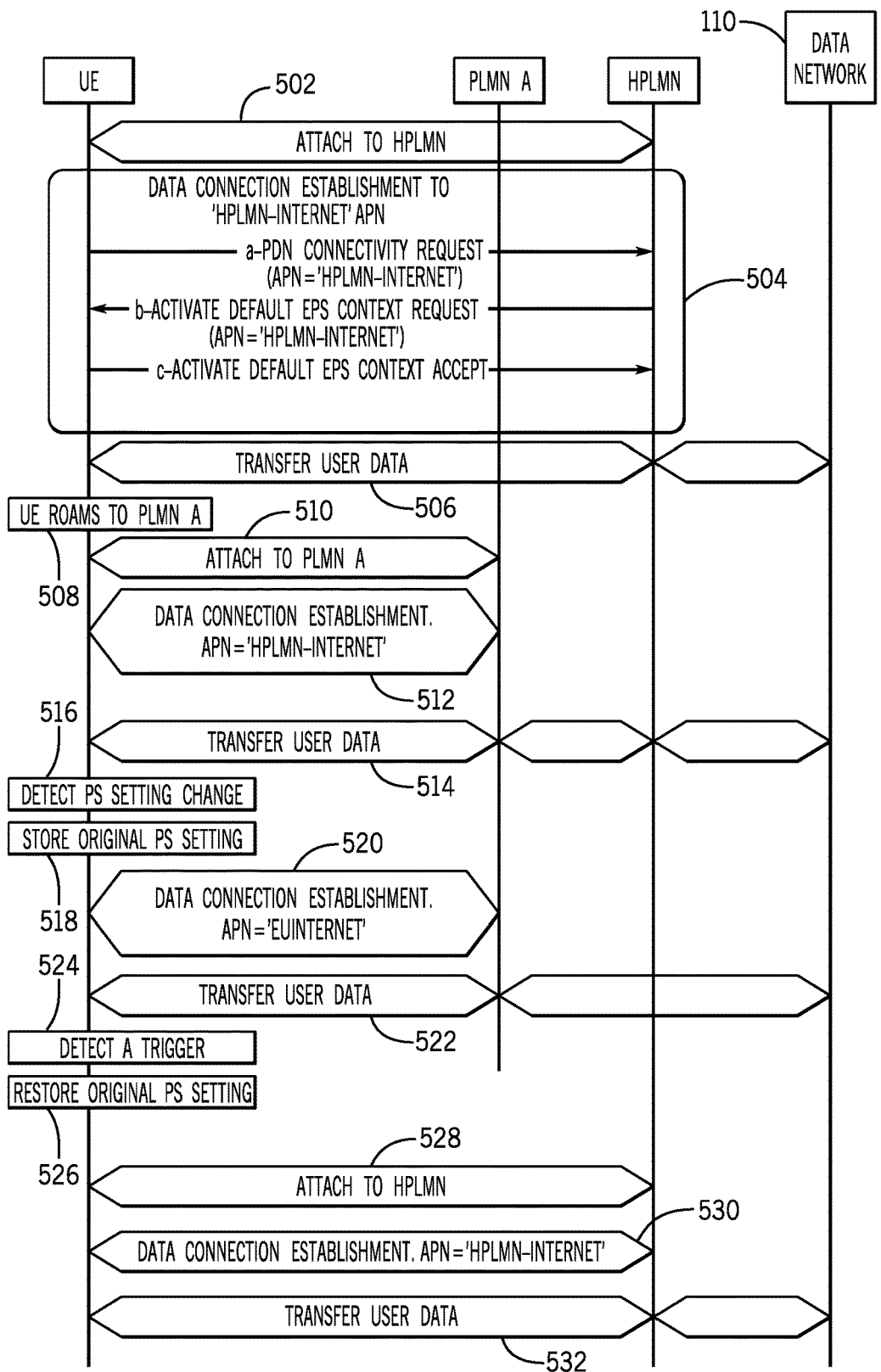
FIGS. 5, 7, and 8 are message flow diagrams of message sequences among various nodes, according to various implementations.

FIG. 5 shows an example of a message sequence involving messages exchanged among a UE, a visited PLMN (PLMN A), a home PLMN, and the data network 110, which may occur with Solution 1. Although specific messages and tasks are depicted in the example, it is noted that in other examples, some of the messages and tasks may be omitted. Also, the order of the messages and tasks may be changed.

The UE is initially within coverage of its home PLMN, where the UE attaches (at 502) to the home PLMN. The UE establishes (at 504) a data connection (e.g. PDN connection) in the home PLMN. The APN for the data connection can be obtained by the UE from its PS settings in the normal manner. In the example of FIG. 5, the APN used is "HPLMN-Internet." The data connection establishment procedure (504) can include the following exchange of messages:

a. A PDN Connectivity Request message is sent from the UE to the home PLMN containing the requested APN. In the case of an LTE network, it is possible that the PDN Connectivity Request message is contained within (or piggybacked on) an Attach Request message (for attaching the UE to the home PLMN). In the case of a 2G/3G network, then the message can instead be an Activate PDP Context Request message.

b. An Activate Default EPS Context Request message (also containing the requested APN) is sent from the home PLMN to the UE. In the case of a 2G/3G network, the message name can be an Activate PDP Context Accept message.

c. An Activate Default EPS Context Accept message is sent from the UE to the home PLMN. In the case of a 2G/3G network, this message may not be used.

After the data connection is established, the UE is able to transfer (at 506) user data to and from the data network 110 through the home PLMN.

Next, the UE moves (at 508) to a new location (e.g. crosses a country border) so that it is no longer in the coverage of the home PLMN, but is roaming in a visited PLMN (referred to as PLMN A in the example of FIG. 5). The UE performs PLMN selection and either the user manually selects PLMN A or the UE automatically selects PLMN A as the most preferred network in which to roam.

The UE next attaches (at 510) to PLMN A. The UE then establishes (at 512) a data connection in PLMN A. The APN is obtained by the UE from its PS settings in the normal manner. In this example, the APN obtained is "HPLMN-Internet." Note that this APN is the APN associated with the home PLMN, so the UE is requesting data connectivity using the home provider solution (not the LBO provider solution). The data connection establishment procedure (512) can include a similar sequence of messages as the data connection establishment procedure (504) discussed above.

The UE is then able to transfer (at 514) user data to and from the data network 110 through PLMN A and the home PLMN (using a path similar to path 118 in FIG. 1, where PLMN A is the visited PLMN of FIG. 1). The data transferred in this manner is considered to be home routed.

Next, the UE detects (at 516) a PS setting change. The new PS setting can include APN set to "EUInternet." The PS setting in the UE may have been changed by the user editing the PS setting (e.g. using a user interface) or by an application or other entity. The change of the PS setting may happen after the user has entered into an agreement for PLMN A to be an LBO provider.

In response to detecting (at 516) the change in the PS setting, the UE stores (at 518) its original PS setting (i.e. the PS setting prior to the change, where the original PS setting has the APN set to "HPLMN-Internet") before applying the new PS setting.

The UE next establishes (at 520) a data connection using the APN "EU Internet." The UE is able to transfer (at 522) user data to and from the data network 110 through the PLMN A (without the user data traversing through the home PLMN). This path for the user data is similar to path 120. The data transferred in this manner may be considered to be locally broken out from PLMN A.

The UE next detects (at 524) a trigger, such as any of the triggers discussed further above. In this example, the trigger is assumed to be due to the UE moving back to the home PLMN. In response to the trigger, the UE restores (at 526) the original PS setting (which has APN equal to "HPLMN-Internet").

Next, the UE attaches (at 528) to the home PLMN. The UE then establishes (at 530) a data connection using the APN (="HPLMN-internet") that is obtained from the restored PS setting. At this point, the UE is able to transfer (at 532) user data to and from the data network 110 through the home PLMN.

The UE may provide an application programming interface (API) to allow machine-readable instructions executing in the UE or machine-readable instructions executing outside the UE (but somehow coupled to the UE (such as by USB, WLAN, Bluetooth, and so forth) to provide the above functionalities (as well as functionalities discussed further below).

Solution 2

In Solution 2, it is assumed that the UE is able to access two or more PS settings, which can include a home PS setting and one or more LBO PS settings for one or more respective LBO providers. The two or more PS settings can be stored in the UE, stored in a memory card (e.g. U(SIM)) insertable into the UE, or stored in an external storage (such as in a network node of a PLMN or in a cloud storage). The UE can access the multiple PS settings to select which PS setting to use depending on which PLMN the UE is attached to or registered with. If the multiple PS settings are stored in a memory card or in external storage, the UE can interact with the memory card or external storage to access the multiple PS settings to determine which PS setting to use.

The values for various PS settings (including the home PS setting and the LBO PS setting(s)) can be configured on the UE using one of various techniques, such as configuration using an OMA DM (Open Mobile Alliance (OMA) Device Management (DM)) technique, configuration using machine-executable instructions (e.g. mobile application or other machine-executable instructions) in the UE or the (U)SIM, a configuration obtained from the (U)SIM, manual configuration by the user (e.g. using a user interface), and so forth.

Each LBO PS setting may be associated with one or more PLMNs. Alternatively or additionally, each PLMN may be associated with one or more LBO PS settings. More generally, there may be an association between one or more LBO settings and one or more PLMNs (one-to-many mapping of one LBO PS setting to many PLMNs or one-to-many mapping of one PLMN to many LBO PS settings).

The association between LBO PS settings and respective PLMNs (or network operators) may be stored as an association data structure in a storage medium in the UE. Alternatively, the association can be stored with an application (e.g. a universal subscriber identity module or USIM application) that resides on a universal integrated circuit card (UICC) of the UE. As another alternative, the association can be stored in the storage medium in the UE and with the USIM application.

In some examples, the association of an LBO PS setting to respective one or more PLMNs may be stored as part of the LBO PS setting. Alternatively or additionally, the association of a PLMN to one or more LBO PS settings may be stored as part of an operator preferred list of PLMNs and/or a user preferred list of PLMNs.

An association between an LBO PS setting and a PLMN can be an association between an identifier of an LBO PS setting and an identifier of a PLMN. An identifier of an LBO PS settings may be made up of a numeric, an alphabetic, or an alphanumeric identifier, e.g. a number, an alphabet string, or a single character or glyph. An identifier of a PLMN can include a PLMN Identifier as defined in 3GPP TS 23.003, or a string of characters that match an alphabetical name associated with the PLMN (e.g., a network name sent by the PLMN, such as by using a Network Identity, Time and Zone (NITZ) as defined in 3GPP TS 22.042), a service set identifier (SSID) or extended SSID, a domain name, a fully qualified domain name (FQDN), an Access Network Identity (ANID) prefix with optional additional character string as defined in 3GPP TS 24.302, and so forth. The identifiers may contain special indications, e.g., one or more characters, to denote a "wildcard" or "pattern matching," such as "regular expressions" e.g. as defined in IEEE Portable Operating System Interface (POSIX) standards.

The following tables illustrate example mapping tables between visited PLMN identifiers (IDs) and respective LBO PS settings. Both tables represent the same example mappings, but are organized differently. Table 1 maps multiple visited PLMN IDs to a respective LBO PS Setting, and Table 2 maps a visited PLMN ID to multiple LBO PS settings. In both tables, the * character is used as a wildcard to denote zero or more letters or numbers of any value, although other or further regular expressions may be used.

TABLE 1

| PLMN ID Type | Visited PLMN ID(s) | LBO PS Setting |
|---|---|---|
| PLMN Identifier | 23415, 23410, 23405 | LBO PS Setting 1 |
| PLMN Identifier | 234*, 12312, 28709 | LBO PS Setting 2 |
| Network name | "Operator X", "Operator Y" | LBO PS Setting 3 |
| SSID/ESSID | "SSID1", "SSID2" | LBO PS Setting 4 |
| Domain name | "mnc015.mcc234.3gppnetwork.org", "mnc010.mcc234.3gppnetwork.org", "mnc005.mcc234.3gppnetwork.org" | LBO PS Setting 1 |
| FQDN | "*.mnc015.mcc234.3gppnetwork.org", "*.mnc010.mcc234.3gppnetwork.org", "*.mnc005.mcc234.3gppnetwork.org" | LBO PS Setting 1 |
| Access Network Identity | "HRPD*", "WLAN" | LBO PS Setting 5 |
| Access Network Identity | "WiMAX", "ETHERNET*" | LBO PS Setting 6 |

In Table 1 a preference of LBO PS settings is indicated implicitly by the order of the LBO PS settings in the table. For any given visited PLMN ID that maps to multiple LBO PS settings in different rows in Table 1, the LBO PS setting of the multiple LBO PS settings in a row higher up in Table 1 is preferred over the LBO PS setting of the multiple LBO PS settings in a lower row in Table 1.

For example, an example visited PLMN ID 23415 is mapped by Table 1 to two LBO PS settings: LBO PS setting 1 in the first row, and LBO PS setting 2 in the second row. Note that in the second row, an entry "234*" is present that matches to PLMN ID 23415. If the UE is in the PLMN having PLMN ID 23415, then it is preferred to use LBO PS setting 1. However, if that is not possible for any reason (as explained further below), then LBO PS setting 2 is used.

In other examples, an explicit preference or priority order can be specified for the LBO PS settings, such as by using respective numbers or other indicators.

TABLE 2

| PLMN ID Type | Visited PLMN ID | LBO PS Setting(s) |
|---|---|---|
| PLMN Identifier | 23415 | LBO PS Setting 1, LBO PS Setting 2 |
| PLMN Identifier | 23410 | LBO PS Setting 1 |
| PLMN Identifier | 23405 | LBO PS Setting 1 |
| PLMN Identifier | 12312 | LBO PS Setting 2 |
| PLMN Identifier | 287092 | LBO PS Setting 2 |
| Network name | "Operator X" | LBO PS Setting 3 |
| Network name | "Operator Y" | LBO PS Setting 3 |
| SSID/ESSID | "SSID1" | LBO PS Setting 4 |
| SSID/ESSID | "SSID2" | LBO PS Setting 4 |
| Domain name | "mnc015.mcc234.3gppnetwork.org" | LBO PS Setting 4 |
| Domain name | "mnc010.mcc234.3gppnetwork.org" | LBO PS Setting 1 |
| Domain name | "mnc005.mcc234.3gppnetwork.org" | LBO PS Setting 1 |
| Access Network Identity | "HRPD*" | LBO PS Setting 5 |
| Access Network Identity | "WLAN" | LBO PS Setting 5 |
| Access Network Identity | "WiMAX" | LBO PS Setting 6 |
| Access Network Identity | "ETHERNET*" | LBO PS Setting 6 |

In Table 2, a preference of LBO PS settings (mapped to a particular visited PLMN ID) is implied by the order of the LBO PS settings (assuming multiple are listed) in the third column of the row corresponding to the particular visited PLMN ID. For example, PLMN ID 23415 is mapped in the first row of Table 2 to two LBO PS settings (setting 1 and 2). The preference of these two settings is indicated by the order of the settings in the third column of the first row of Table 1. More specifically, LBO PS setting 1 is more preferred than LBO PS setting 2.

In other examples, an explicit preference or priority order can be specified for the LBO PS settings, such as by using respective numbers or other indicators.

Figure 6:
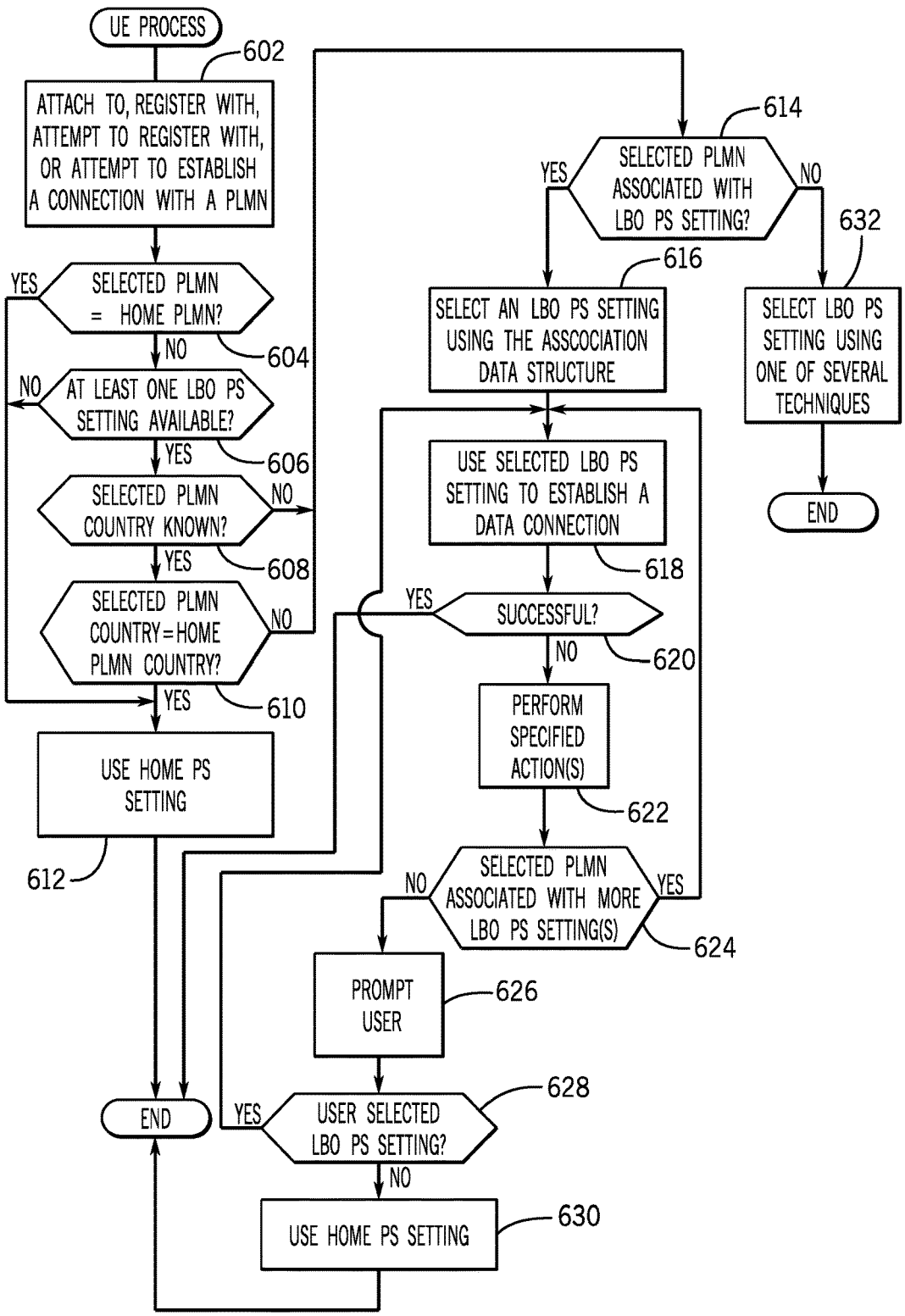

FIG. 6 is a flow diagram of a UE process for determining which of the multiple PS settings (home PS setting and one or more LBO PS settings) to use for solution 2, in some examples. Some of the tasks depicted in FIG. 6 may be omitted, or the order of the tasks may be different.

The UE attaches to, or registers with, or attempts to register with, or attempts to establish a connection with (at 602) a PLMN (hereinafter referred to as the "selected PLMN"). If the selected PLMN is determined (at 604) to be the home PLMN (actual home PLMN or equivalent home PLMN) of the UE, then the UE uses (at 612) the home PS setting.

If the selected PLMN is determined (at 604) to not be a home PLMN (in other words, the selected PLMN is a visited PLMN), the UE determines (at 606) whether the at least one LBO setting is available to the UE. If not, then the UE uses (at 612) the home PS setting. However, if at least one LBO setting is available, the UE determines (at 608) if the country of the visited PLMN is known. If not, the process proceeds to task 614. If the country of the visited PLMN is known, then the UE determines (at 610) if the country of the visited PLMN is the same country as the home PLMN. If so, then the UE uses (at 612) the home PS setting.

If the country of the visited PLMN is not the same country as the home PLMN, then the process proceeds to task 614. Task 614 involves determining whether the visited PLMN is associated with at least one LBO PS setting. This determination can be made by accessing Table 1 or 2, for example, or by accessing another association data structure.

Using the association data structure (e.g. Table 1 or 2 or another association data structure), the UE selects (at 616) an LBO PS setting for the visited PLMN (in an example where the PLMN ID of the visited PLMN maps to multiple LBO PS settings, the UE can select from among the multiple LBO PS settings, such as discussed further above). The UE uses (at 618) the selected LBO PS setting to establish a data connection, such that the data service is provided to the UE by an LBO provider of the visited PLMN rather than the home PLMN.

In further implementations, the UE may prompt the user to confirm that an LBO provider solution is to be selected, prior to making the selection at 616. Also, if there are more than one set of LBO PS settings associated with the visited PLMN (e.g., for instances where there is more than one LBO provider associated with the visited PLMN), or if the LBO PS setting(s) associated with the visited PLMN is (are) marked invalid or not applicable or disabled or inactive or deactivated or dormant or quiescent or inoperative, then the UE may perform one or a combination of the following actions (optionally repeating indefinitely or for a specific amount of time or repeating a specific number of times for all LBO PS settings that are stored in the UE):
  a. Prompt the user to select which of the LBO PS settings to use or whether to use the home PS setting.
  b. Attempt to use one LBO PS setting associated with the visited PLMN to establish a data connection where the one LBO PS setting used may be chosen using a combination of one or more of the criteria discussed further below.

The UE next determines (at 620) if a data connection was successfully established. If so, data transfer can proceed using the established data connection.

However, if the UE fails to establish a data connection using the selected LBO PS setting (e.g., one or more errors or cause codes were received one or more times in response to a data connection establishment message), then the UE may perform (at 622) one or more of the following:
  a. Remove the selected LBO PS setting from the UE.
  b. Store an indication (e.g. with the selected LBO PS setting) indicating that the selected LBO PS setting is invalid or not applicable.
  c. Store a time (which can include a date or a time, or both) that the selected LBO PS setting was used and the failure was determined.
  d. Subsequently, not provide the selected LBO PS setting (or a corresponding alias or pseudonym or "friendly name") in prompts to the user, such as for further data connections. Not providing the selected LBO PS setting in prompts to the user can be performed indefinitely, or for some specified time period (e.g. until a UE power off (and optionally UE power on also) and/or until the (U)SIM is removed and/or until the UE detects a new (U)SIM, or a certain time occurs, or for some specified time period relative to the time of the failure to establish the data connection.

The UE then determines (at 624) whether there are more LBO PS setting(s) associated with the visited PLMN. If so, the UE selects the next LBO PS setting associated with the visited PLMN, and proceeds to task 618.

If the UE determines (at 624) that there are no more LBO PS settings associated with the visited PLMN, then the UE can prompt (at 626) the user to select an LBO PS setting. If the UE determines (at 626) that a user selection of an LBO PS setting has been received, then the process proceeds to task 618.

However, if the UE determines (at 626) that the user has not selected an LBO PS setting, then the UE uses (at 630) the home PS setting to establish a data connection.

If the UE succeeds in establishing a data connection using a selected LBO PS setting and there is currently no association stored between the visited PLMN and the selected LBO PS setting, then the UE may store an association between the visited PLMN and the selected LBO PS setting.

If the UE determines (at 614) that the visited PLMN is not associated with any LBO PS setting, then the UE may select (at 632) an LBO PS setting using one or a combination of the following:
  a. Prompt the user to select a PS setting to use, which can be an LBO PS setting or a home PS setting.
  b. Select an LBO PS setting using a combination of one or more of the criteria discussed further below.
  c. Select the home PS setting.

In addition to or as an alternative to an association between one or more visited PLMNs and one or more LBO PS settings, the UE may use one or more of the following criteria in selecting which LBO PS setting, if any, to use when establishing a data connection or whether to use the home PS setting rather than an LBO PS setting:
  Select an LBO PS setting based on a preference or priority associated with one or more LBO PS settings e.g. the preference or priority can be based on the position in a list of each LBO PS setting, or a value that is part of each LBO PS setting.
  Select an LBO PS setting that was last used.
  Select an LBO PS setting that was last used with the current visited PLMN.
  Select an LBO PS setting based on a relative time since the last data connection.
  Select an LBO PS setting based on a relative time since the last data connection to the current visited PLMN.
  Select an LBO PS setting based on an amount of data transferred since a particular time.
  Select an LBO PS setting based on an amount of data transferred since a particular time on previous data connections to the current visited PLMN.
  Select an LBO PS setting based on a current time.
  Select an LBO PS setting based on a current time zone where the UE is located.
  Select an LBO PS setting based on the access technology in use by the UE on the visited PLMN (e.g. 4G/LTE/E-UTRAN, 3G/UMTS/UTRAN, 2G/GPRS/GERAN, Wi-Fi or WLAN, Ethernet, DSL, Cable etc.)
  Select an LBO PS setting based on a current country or specific location of the UE, which can be obtained by one or a combination of the following, as examples:
    MCC or MCC and MNC broadcast by one or more PLMNs that are detectable by the UE, e.g. current visited PLMN.
    Geographic coordinates obtained using any of various techniques, such as based on satellite data, cellular data, or other data.
    PLMN identifiers that are detectable by the UE.
    Medium Access Control (MAC) addresses and/or SSIDs/ESSIDs of base stations or access points that are detectable by the UE.
    A string of text received from a wireless network.
    A technique as described in Request for Comments (RFC) 6280, "An Architecture for Location and Location Privacy in Internet Associations."
    Use of waypoints.

Figure 7:
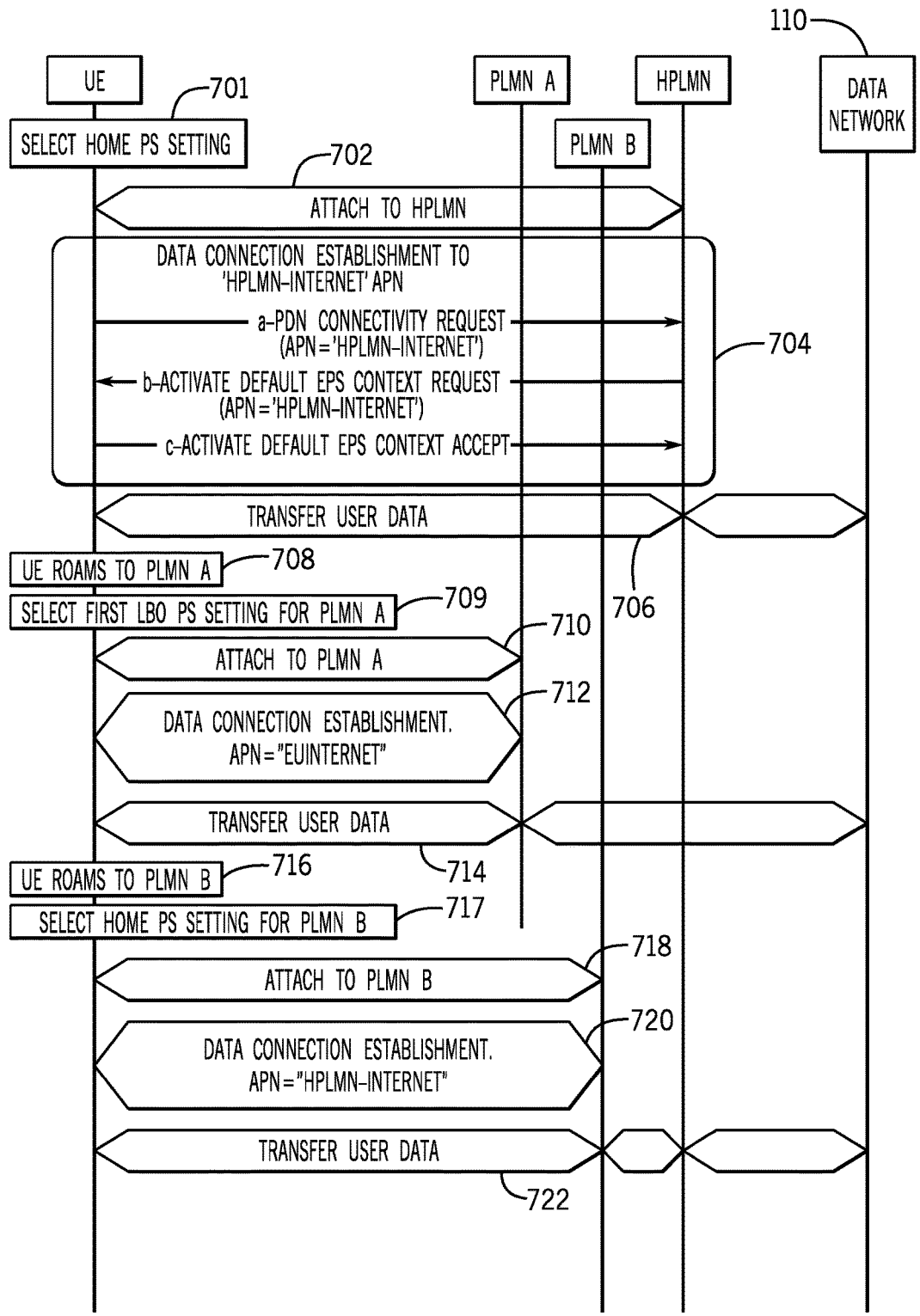

FIG. 7 shows an example of a message sequence involving messages exchanged among a UE, PLMN A, PLMN B, a home PLMN, and the data network 110, which may occur with Solution 2. Although specific messages and tasks are depicted in the example, it is noted that in other examples, some of the messages and tasks may be omitted. Also, the order of the messages and tasks may be changed.

The UE is initially within coverage of its home PLMN. The UE accesses PS settings, and using the accessed PS settings, the UE selects (at 701) the home PS setting (in which the APN="HPLMN-Internet."). The UE also attaches (at 702) to the home PLMN. The UE establishes (at 704) a data connection (PDN connection) in the home PLMN. In the example of FIG. 7, the APN used is "HPLMN-Internet." After the PDN connection is established, the UE is able to transfer (at 706) user data to and from the data network 110 through the home PLMN.

Note that tasks 702, 704, and 706 in FIG. 7 are the same as or similar to tasks 502, 504, and 506 in FIG. 5.

Next, the UE moves (at 708) to a new location (e.g. crosses a country border) so that it is no longer in the coverage of the home PLMN, but is roaming in a visited PLMN (referred to as PLMN A in the example of FIG. 7). The UE performs PLMN selection and either the user manually selects PLMN A or the UE automatically selects PLMN A as the most preferred network in which to roam.

Using techniques discussed above in connection with FIG. 6, the UE selects (at 709) a first LBO PS setting associated with PLMN A, where the first LBO PS setting can have APN="EU Internet." Selecting the first LBO PS setting can be a selection from among multiple LBO PS settings available to or stored by the UE.

The UE attaches (at 710) to PLMN A. The UE then establishes (at 712) a data connection in PLMN A, using an APN="EUInternet." The UE is then able to transfer (at 714) user data to and from the data network 110 through PLMN A. The transferred data is considered to be locally broken out from PLMN A.

Next, the UE moves (at 716) to a new location so that it is no longer in the coverage of the PLMN A, but is roaming in another visited PLMN (referred to as PLMN B in the example of FIG. 7). Note that the UE selects PLMN B by automatic or manual PLMN selection. The UE selects (at 717) a PS setting associated with PLMN B, which can be the home PS setting where APN="HPLMN-Internet."

The UE attaches (at 718) to PLMN B. The UE then establishes (at 720) a data connection using APN="HPLMN-internet." The UE is able to transfer (at 722) user data to and from the data network 110 using PLMN B and the home PLMN. Such transferred data may be home routed via the home PLMN.

Figure 8:
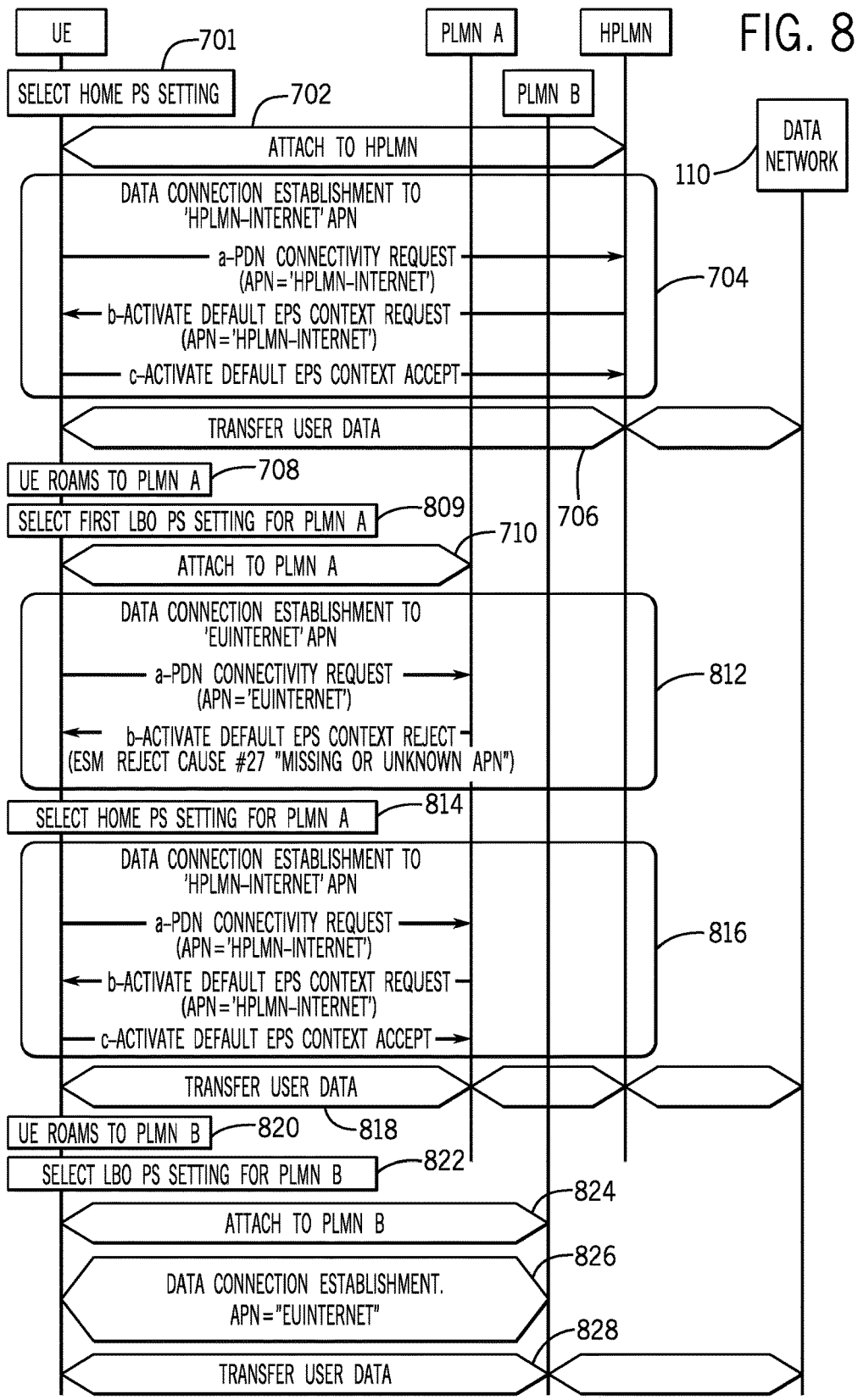

FIG. 8 shows an example of another message sequence involving messages exchanged among a UE, PLMN A, PLMN B, a home PLMN, and the data network 110, which may occur with Solution 2. Although specific messages and tasks are depicted in the example, it is noted that in other examples, some of the messages and tasks may be omitted. Also, the order of the messages and tasks may be changed.

Tasks 701, 702, 704, 706, 708, and 710 in FIG. 8 are the same as tasks with the same reference numerals in FIG. 7.

After the UE has roamed (at 708) to PLMN A, it is assumed in the example of FIG. 8 that the UE does not have an association between PLMN A and any LBO PS setting in the UE. Using techniques discussed further above in connection with task 632 in FIG. 6, the UE selects (at 809) a first LBO PS setting, which can have APN="EUInternet." Selecting the first LBO PS setting can be a selection from among multiple LBO PS settings available to or stored by the UE.

After attaching (at 710) to PLMN A, the UE attempts (at 812) establishment of a data connection using the first LBO PS setting (with APN="EUInternet"). The data connection establishment procedure (812) can include the following exchange of messages:

a. A PDN Connectivity Request message is sent from the UE to PLMN A containing APN="EUInternet." In the case of a 2G/3G network, then the message name would be Activate PDP Context Request.

b. An Activate Default EPS Context Request message (containing a reject cause value) is sent from PLMN A to the UE. In this example, it is assumed that this data connection establishment procedure is unsuccessful. Examples of the reject cause value can be cause #27 "missing or unknown APN" or #33 "requested service option not subscribed", or another cause value. In the case of a 2G/3G network, then the message name would be Activate PDP Context Reject, which can contain similar error cause values.

Following the failed data connection establishment attempt, the UE selects (at 814) the home PS setting, which can include APN="HPLMMN-Internet." The UE then attempts a data connection establishment (at 816) using the home PS setting. It is assumed that this data connection establishment is successful, and thus the UE is able to transfer (at 818) user data to and from the data network 110 using PLMN A and the home PLMN.

The UE later moves (at 820) to another location, and the UE selects PLMN B (manual or automatic PLMN selection). The UE selects (at 822) an LBO PS setting (with APN="EUInternet") for PLMN B. The UE attaches (at 824) to PLMN B, and attempts a data connection establishment (at 826), with APN="EU Internet." The data connection establishment attempt is successful, and the UE is able to transfer (at 828) user data to and from the data network 110 using PLMN B.

Solution 3

A further issue is associated with the use of automatic network selection by a UE. When the UE is attached to a PLMN that is not the home PLMN of the UE, the UE may perform a network scan to try to find its home PLMN or a higher priority visited PLMN. The UE may have access to a user preferred list of PLMNs and/or operator preferred list of PLMNs (and their respective priorities), where such list(s) can be used for identifying a higher priority PLMN found in the network scan. The network scan can be performed by the UE at specified time intervals. In some examples, the list(s) may be stored within a universal subscriber identity module (USIM) in a universal integrated circuit card (UICC) of the UE. If the UE detects a higher priority PLMN in the network scan, the UE can register with the higher priority PLMN to access the resources of the higher priority PLMN. If available, the home PLMN is the highest priority PLMN.

The highest priority PLMN that the UE registers with may not be the visited PLMN associated with a particular LBO provider that the user of the UE has signed up with. As an example, when the UE is roaming in a first visited PLMN, the user of the UE may decide to use the LBO provider solution in the first visited PLMN. However, if the UE performs automatic network selection and a network scan results in the UE registering with a highest priority PLMN that is not the first visited PLMN, then the UE would no longer be able to use the LBO provider solution. To address this issue, the user of the UE may manually change the network selection mode to the manual network selection mode. Being in the manual network selection mode forces the UE to remain registered with the currently registered PLMN, even if other PLMNs may be available that have higher priorities.

However, the UE remains registered with the currently registered PLMN even if the UE loses wireless coverage to the currently registered PLMN. This would cause the UE to lose network service, with no automatic recovery possible, except in the situation where the UE set to automatic network selection mode is switched on and the home PLMN or an equivalent home PLMN is found, in which case the UE can automatically register to the home or equivalent home PLMN. Once network service is lost, the user of the UE may then have to change the network selection mode to the automatic network selection mode, to allow the UE to find another available PLMN.

For a UE that has access or stores an association between LBO PS settings and respective visited PLMNs (e.g. UE implements Solution 2), the UE may also use such LBO PS settings (or the existence of such LBO PS settings) when selecting a PLMN during an automatic network selection mode procedure (such as according to 3GPP TS 23.122), or to assist the user during a manual network selection mode procedure (such as according to 3GPP TS 23.122).

A UE configured to use an automatic network selection mode procedure can automatically choose an available visited PLMN (e.g. PLMN A) over another available visited PLMN (PLMN B) to which to attempt to attach based on one or more criteria. The one or more criteria can consider information in an operator preferred list and/or a user preferred list of PLMNs. The one or more criteria can alternatively or additionally include one or more of the following:

A criterion relating to a determination by the UE that at least one LBO PS setting is associated with PLMN A and no LBO PS setting is associated with PLMN B.

A criterion relating to a determination by the UE that at least one LBO PS setting is associated with PLMN A and at least one LBO PS setting is associated with PLMN B, and in addition, that the at least one LBO PS setting associated with PLMN A has a greater priority than the at least one LBO PS setting associated with PLMN B.

A criterion relating to a determination by the UE that at least one LBO PS setting is associated with each of PLMN A and PLMN B, and that the at least one LBO PS setting has a greater priority of using or attaching to PLMN A than PLMN B.

As an alternative to the above, the UE can modify or re-prioritize or be instructed to modify or re-prioritize one or both of an operator preferred list (e.g. the "Operator controlled PLMN selector with Access Technology" obtained from the USIM application in the UICC card in the data field EFOPLMNwAT) or a user preferred list (e.g. the "User controlled PLMN selector with Access Technology" obtained from the USIM application in the UICC card in the data field EFPLMNWAGT) in the UE and/or in the (U)SIM. The instruction to modify or re-prioritize can be received from a user, in an indication received from the home PLMN (such as over the air, from machine-readable instructions running in the UE, and so forth). The lists can be modified after the UE is configured (e.g. by the user, by receiving an indication from the home PLMN (such as over the air), by machine-readable instructions running on the UE, and so forth) with:

a new set of LBO PS settings; or a new association or new disassociation between a PLMN and a LBO PS setting; or a new indication (e.g. in one or more LBO PS settings) of prioritization of one or more PLMNs over one or more other PLMNs for one or more LBO PS settings.

To change the priority of one PLMN over another PLMN based on any of the foregoing, the UE may modify the operator preferred list or user preferred list, such as by adding a PLMN identifier (e.g. MCC and MNC) to a list, or moving a PLMN identifier within a list from one position to another position (where the different positions can indicate different priorities—moving a PLMN identifier up in a list will increase its priority, but moving down a PLMN identifier down in the list will decrease its priority). Modifying the foregoing lists can influence the UE when performing an automatic network selection mode procedure to choose an available PLMN.

A UE configured to use a manual network selection mode procedure can indicate (e.g. on a display associated with the UE) to the user one or more LBO PS settings that can be used for an available PLMN. In addition to or as an alternative, the UE may indicate a preference or recommendation to choose an available PLMN (e.g. PLMN A) over another available PLMN (e.g. PLMN B) to which to attempt to attach based on one or a combination of:

A criterion relating to a determination by the UE that at least one LBO PS setting is associated with PLMN A and no LBO PS setting is associated with PLMN B.

A criterion relating to a determination by the UE that at least one LBO PS setting is associated with PLMN A and at least one LBO PS setting is associated with PLMN B, and in addition, that the at least one LBO PS setting associated with PLMN A has a greater priority than the at least one LBO PS setting associated with PLMN B.

A criterion relating to a determination by the UE that at least one LBO PS setting is associated with each of PLMN A and PLMN B, and that the at least one LBO PS setting has a greater priority of using or attaching to PLMN A than PLMN B.

The indication of the preference or recommendation of PLMNs presented in the display when using the manual network selection mode procedure can include one or a combination of the following:

A specific ordering of available PLMN identities in a list, e.g. highest priority PLMN listed first or at the top of the list;

A mark or other indicator shown next to or associated with each available PLMN identifier, where the mark or other indicator can indicate a relative priority of the PLMNs;

A change of font characteristics (e.g. size, color, bold, italic, underline, etc.) of the available PLMN identifiers, which can provide an indication of relative priority.

Instead of displaying a PLMN identifier, the UE can alternatively or additionally display an alias of the PLMN. Such aliases can include any or some combination of the following: a network, operator or carrier name, a network, operator, or carrier logo, and so forth.

Figure 9:
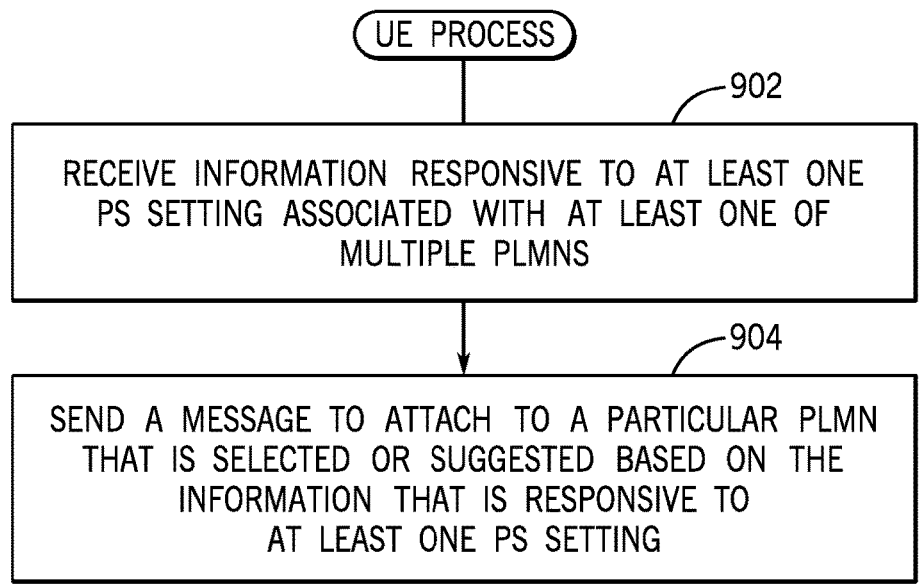
FIG. 9 is a flow diagram of a UE process according to alternative implementations.

FIG. 9 is a flow diagram of a process of a UE, according to some implementations. The UE receives (at 902) information responsive to at least one PS setting associated with at least one of multiple PLMNs. The information responsive to a PS setting can include the PS setting itself. Alternatively, the information responsive to a PS setting can include a list (such as the operator preferred list or user preferred list) of PLMN identifiers or aliases that have been ordered based on the PS setting.

The UE sends (at 904) a message to attach to a particular PLMN that is selected or suggested by the UE from the multiple PLMNs, where the selecting or suggesting is based on the information responsive to at least one PS setting. As noted above, the particular PLMN can be selected automatically in an automatic network selection mode of the UE. Alternatively, the particular PLMN can be selected manually by a user in a manual network selection mode of the UE, where the manual selection is based on suggestion of relative priorities of the multiple PLMNs presented in a display of the UE.

System Architecture

Figure 10:
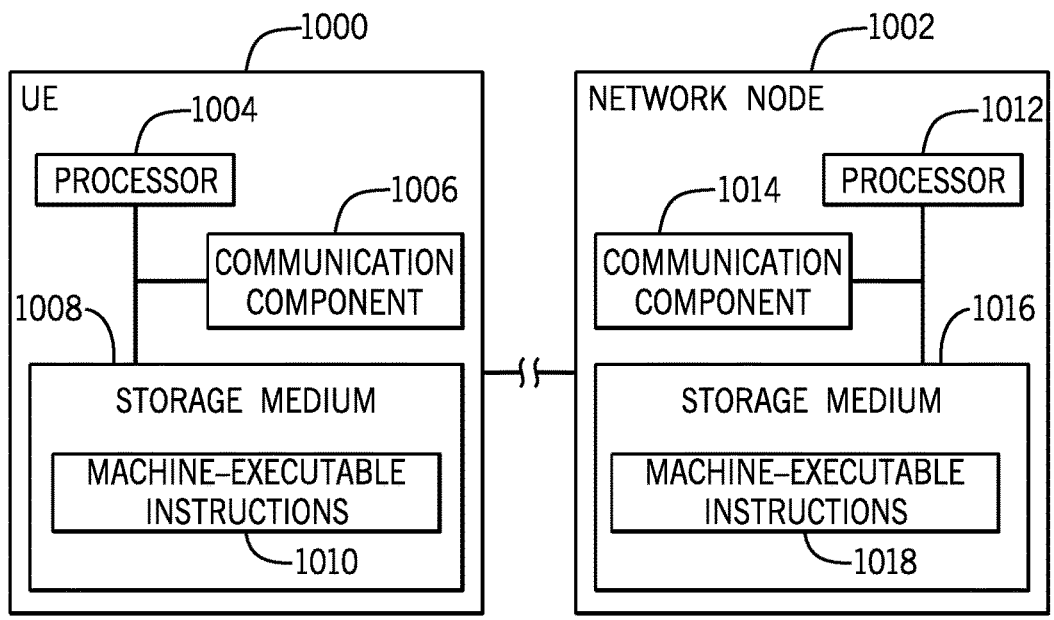
FIG. 10 is a block diagram of a UE and a network node, according to some implementations.

FIG. 10 is a block diagram of an example arrangement that includes the UE 100 and a network node 1002 according to some implementations. The network node 1002 can be in a core network of a PLMN. In FIG. 10, nodes of an access network are omitted. The network node 1002 can be an SGSN in a GPRS network, or a mobility management entity (MME) and/or a serving gateway (S-GW) in an LTE network. An MME is a control node for performing various control tasks associated with an LTE network. For example, the MME can perform idle mode UE tracking and paging, bearer activation and deactivation, selection of an S-GW when the UE initially attaches to the LTE network, handover of the UE between access networks, authentication of a user, generation and allocation of a temporary identity to a UE, and so forth. In other examples, the MME can perform other or alternative tasks.

The UE 100 includes one or more processors 1004. A processor can include a microprocessor, microcontroller, processor module or subsystem, programmable integrated circuit, programmable gate array, or another control or computing device. The processor(s) 1004 can be coupled to a communication component 1006 to allow the UE 100 to communicate over a network. The processor(s) 1004 can be coupled to a non-transitory machine-readable storage medium (or storage media) 1008, which can store machine-executable instructions 1010 that are executable on the processor(s) 1004.

The network node 1002 includes one or more processors 1012, which can be coupled to a communication component 1014 and a non-transitory machine-readable storage medium (or storage media) 1016 that can store machine-executable instructions 1018.

The machine-readable instructions 1010 and 1018 are executable to perform various tasks as discussed above.

The storage media 1008 and 1016 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a user equipment (UE), comprising:
    storing, in the UE, a first network configuration that maps to a first set of corresponding packet-switched settings comprising a first access point name (APN) that identifies a respective packet data network or a respective data service;
    storing, in the UE, a second network configuration that maps to a second set of corresponding packet-switched settings comprising a second APN that identifies a respective packet data network or a respective data service;
    determining whether the UE is in a first network or a second network;
    in response to the UE being in the first network, sending, by the UE, a first message including the first APN to the first network to activate a data connection; and
    in response to the UE being in the second network and outside a wireless coverage of the first network:
        selecting, by the UE, one of the first APN and the second APN to use in the second network,
        in response to selecting the second APN, sending, by the UE, a second message including the second APN to the second network to activate a data connection, wherein in the data connection activated in response to the second message that includes the second APN, data of the UE is communicated through the second network without passing through the first network, and
        in response to selecting the first APN, sending, by the UE, a third message including the first APN to the second network to activate a data connection, wherein in the data connection activated in response to the third message that includes the first APN, data of the UE is communicated through the second network and the first network.

2. The method of claim 1, wherein the selecting of the first APN and the sending of the third message are triggered by a trigger condition.

3. The method of claim 2, wherein the trigger condition causes the UE to revert back to using the first set of corresponding packet-switched settings.

4. The method of claim 3, wherein the trigger condition is selected from among: the UE registering with or attempting to register with a home network, the UE registering with or attempting to register with a network in a same country as the home network, the UE registering with or attempting to register with a network that is different from the second network, the UE switching a network selection mode from a first mode to a second mode, and a rejection by the second network of a request to establish a data connection based on the second message.

5. The method of claim 1, further comprising:
    in response to the UE being in the first network, sending, by the UE, a first set of authentication credentials along with the first APN.

6. The method of claim 1, further comprising:
    in response to the UE being in the second network, sending, by the UE, a second set of authentication credentials.

7. The method of claim 1, wherein the first network is a first public land mobile network (PLMN) that comprises a first wireless access network with a first coverage area, and the second network is a second PLMN that comprises a second wireless access network with a second coverage area different from the first coverage area, and wherein the UE sends the second message to the second network in response to the UE determining that the UE is in the second coverage area of the second wireless access network of the second PLMN and outside the first coverage area of the first wireless access network of the first PLMN.

8. The method of claim 1, wherein the first set of corresponding packet-switched settings further comprise at least one selected from among: a Packet Data Protocol type or Packet Data Network type, an Internet Protocol address, a dynamic address allowed indicator, an authentication credential, a quality-of-service profile requested, a traffic flow template, or a closed subscriber group list.

9. The method of claim 1, further comprising updating the corresponding packet-switched settings of the first set or second set stored in the UE.

10. The method of claim 1, wherein a transfer of data of the UE in the data connection activated in response to the third message that includes the first APN is a home routed transfer of data, and a transfer of data of the UE in the data connection activated in response to the second message that includes the second APN is a local break-out (LBO) transfer of data.

11. A user equipment (UE) comprising:
at least one processor configured to:
cause storing of a first network configuration that maps to a first set of corresponding packet-switched settings comprising a first access point name (APN) that identifies a respective packet data network or a respective data service;
cause storing of a second network configuration that maps to a second set of corresponding packet-switched settings comprising a second APN that identifies a respective packet data network or a respective data service;
determine whether the UE is in a first network or a second network;
in response to the UE being in the first network, cause sending of a first message including the first APN to the first network to activate a data connection; and
in response to the UE being in the second network and outside a wireless coverage of the first network:
select one of the first APN and the second APN to use in the second network,
in response to selecting the second APN, cause sending of a second message including the second APN to the second network to activate a data connection, wherein the data connection activated in response to the second message that includes the second APN transfers data of the UE through the second network without passing through the first network, and
in response to selecting the first APN, cause sending of a third message including the first APN to the second network to activate a data connection, wherein the data connection activated in response to the third message that includes the first APN transfers data of the UE through the second network and the first network.

12. The UE of claim 11, wherein the selecting of the first APN and the sending of the third message are triggered by a trigger condition.

13. The UE of claim 12, wherein the trigger condition causes the UE to revert back to using the first set of corresponding packet-switched settings.

14. The UE of claim 13, wherein the trigger condition comprises a rejection by the second network of a request to establish a data connection based on the second message.

15. The UE of claim 11, wherein the at least one processor is configured to:
in response to the UE being in the first network, cause sending of a first set of authentication credentials along with the first APN; and
in response to the UE being in the second network, cause sending of a second set of authentication credentials.

16. The UE of claim 11, wherein the first network is a first public land mobile network (PLMN) that comprises a first wireless access network with a first coverage area, and the second network is a second PLMN that comprises a second wireless access network with a second coverage area different from the first coverage area, and wherein the at least one processor is to cause sending of the second message to the second network in response to the at least one processor determining that the UE is in the second coverage area of the second wireless access network of the second PLMN and outside the first coverage area of the first wireless access network of the first PLMN, the second PLMN being different from the first PLMN.

17. The UE of claim 11, wherein the first set of corresponding packet-switched settings further comprise at least one selected from among: a Packet Data Protocol type or Packet Data Network type, an Internet Protocol address, a dynamic address allowed indicator, an authentication credential, a quality-of-service profile requested, a traffic flow template, or a closed subscriber group list.

18. A non-transitory machine-readable storage medium storing instructions that upon execution cause a user equipment (UE) to:
cause storing of a first network configuration that maps to a first set of corresponding packet-switched settings comprising a first access point name (APN) that identifies a respective packet data network or a respective data service;
cause storing of a second network configuration that maps to a second set of corresponding packet-switched settings comprising a second APN that identifies a respective packet data network or a respective data service;
determine whether the UE is in a first network or a second network;
in response to the UE being in the first network, cause sending of a first message including the first APN to the first network to activate a data connection; and
in response to the UE being in the second network and outside a wireless coverage of the first network:
in response to selecting the second APN, cause sending of a second message including the second APN to the second network to activate a data connection, wherein in the data connection activated in response to the second message that includes the second APN, data of the UE is communicated through the second network without passing through the first network, and
in response to selecting the first APN, cause sending of a third message including the first APN to the second network to activate a data connection, wherein in the data connection activated in response to the third message that includes the first APN, data of the UE is communicated through the second network and the first network.

* * * * *